(12) United States Patent
Knibbe et al.

(10) Patent No.: US 10,664,608 B2
(45) Date of Patent: May 26, 2020

(54) METHODS AND SYSTEMS FOR PROVIDING CONDITIONAL ACCESS TO INDOOR LOCATION INFORMATION

(71) Applicant: SIGNIFY HOLDING B.V., Eindhoven (NL)

(72) Inventors: Engel Johannes Knibbe, Heeze (NL); Onno Martin Janssen, Geldrop (NL); Hans Van Amstel, Eindhoven (NL); Stephanus Joseph Johannes Nijssen, Eindhoven (NL); Mark Henricus Verberkt, Eindhoven (NL); Emmanuel David Lucas Michael Frimout, Nuenen (NL); Xiangyu Wang, Eindhoven (NL); Peter Johannes Lenoir, S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 216 days.

(21) Appl. No.: 15/548,551

(22) PCT Filed: Jan. 22, 2016

(86) PCT No.: PCT/EP2016/051346
§ 371 (c)(1),
(2) Date: Aug. 3, 2017

(87) PCT Pub. No.: WO2016/124424
PCT Pub. Date: Aug. 11, 2016

(65) Prior Publication Data
US 2018/0018473 A1    Jan. 18, 2018

(30) Foreign Application Priority Data
Feb. 3, 2015 (EP) .................................. 15153560

(51) Int. Cl.
*G06F 21/62* (2013.01)
*H04W 4/02* (2018.01)
(Continued)

(52) U.S. Cl.
CPC ........ *G06F 21/6218* (2013.01); *G06F 21/105* (2013.01); *H04L 63/0892* (2013.01);
(Continued)

(58) Field of Classification Search
CPC ..... G06F 21/105; G06F 21/6218–6281; G06F 2221/0773; G06F 2221/2111;
(Continued)

(56) References Cited

U.S. PATENT DOCUMENTS

2004/0185842 A1* 9/2004 Spaur ...................... B60R 25/04
455/420
2012/0011578 A1  1/2012 Hinton et al.
(Continued)

*Primary Examiner* — Kevin Bechtel
(74) *Attorney, Agent, or Firm* — Meenakshy Chakravorty

(57) ABSTRACT

The invention relates to a system and methods for providing conditional access to indoor location information in a system comprising a mobile device (320), a positioning webservice (310) and an authorization authority (360), the method comprising: the mobile device (320) performing the steps of: transmitting license information to the authorization authority (360) and transmitting a request for indoor location information to the positioning webservice, the request comprising a request-location-estimate corresponding to a location estimate of the mobile device (320) at the time of making the request, the authorization authority (360) performing the steps of: receiving the license information, verifying whether the license information authorizes access to indoor location information by the mobile device (320), issuing a secure proof, verifiable by the positioning webservice (310) upon successful verification, the secure proof indicating that the license information authorizes access to indoor location information by the mobile device (320) for
(Continued)

an authorized region; the positioning webservice (310) performing the steps of: receiving the request for indoor location information and the secure proof; verifying whether the secure proof authorizes the transmission of indoor location information to the mobile device (320) for the request-location-estimate; and upon successful verification sending indoor location information for the request-location-estimate to the mobile device (320).

15 Claims, 7 Drawing Sheets

(51) Int. Cl.
  *H04W 4/33* (2018.01)
  *H04W 4/029* (2018.01)
  *H04L 29/06* (2006.01)
  *H04W 12/08* (2009.01)
  *H04W 48/04* (2009.01)
  *G06F 21/10* (2013.01)
  *H04W 12/00* (2009.01)

(52) U.S. Cl.
  CPC .......... *H04L 63/107* (2013.01); *H04L 63/108* (2013.01); *H04W 4/027* (2013.01); *H04W 4/029* (2018.02); *H04W 4/33* (2018.02); *H04W 12/08* (2013.01); *H04W 48/04* (2013.01); *G06F 2221/0773* (2013.01); *H04L 63/0807* (2013.01); *H04W 12/00503* (2019.01)

(58) Field of Classification Search
  CPC ......... G06F 2221/2141; H04L 63/0807; H04L 63/0823; H04L 63/0892; H04L 63/107; H04L 63/108; H04W 4/02; H04W 4/025–029; H04W 4/33; H04W 12/005–00504; H04W 12/02; H04W 12/08; H04W 48/04
  See application file for complete search history.

(56) References Cited

U.S. PATENT DOCUMENTS

| | | | |
|---|---|---|---|
| 2013/0042298 A1* | 2/2013 | Plaza Fonseca | G06F 21/335 726/1 |
| 2014/0189806 A1 | 7/2014 | Cho | |
| 2014/0299659 A1* | 10/2014 | Masuko | G06Q 30/0281 235/375 |
| 2015/0024782 A1 | 1/2015 | Edge | |

* cited by examiner

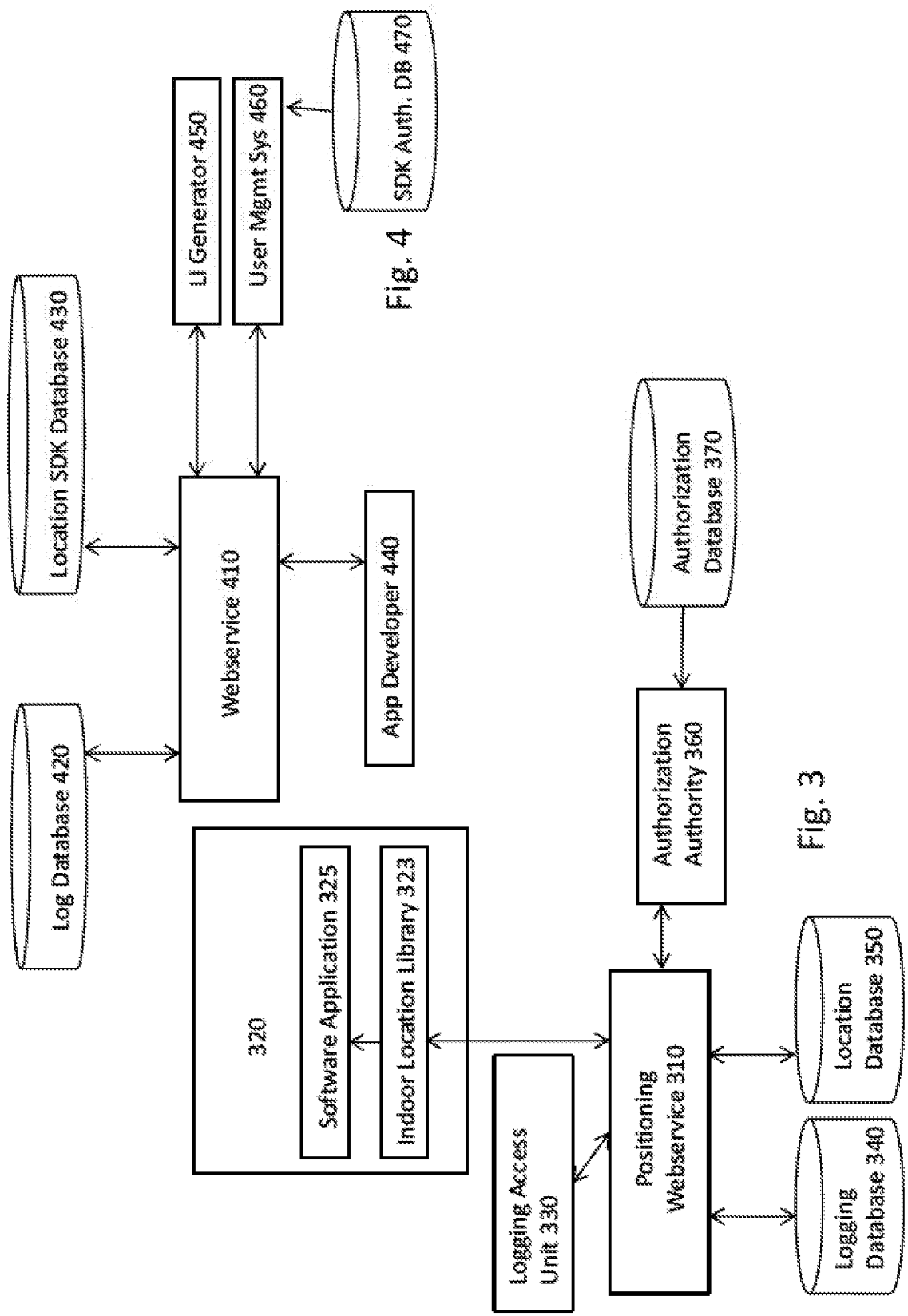

METHODS AND SYSTEMS FOR PROVIDING CONDITIONAL ACCESS TO INDOOR LOCATION INFORMATION

CROSS-REFERENCE TO PRIOR APPLICATIONS

This application is the U.S. National Phase application under 35 U.S.C. § 371 of International Application No. PCT/EP2016/051346, filed on Jan. 22, 2016, which claims the benefit of European Patent Application No. 15153560.6, filed on Feb. 3, 2015. These applications are hereby incorporated by reference herein.

FIELD OF THE INVENTION

The present invention relates generally to the field of indoor location systems, and more in particular provides various systems and methods of providing conditional access to location information within such an indoor location system as well as corresponding computer program products. Further disclosed herein are methods for supporting the use of an indoor location system in various stages of development in a holistic manner, thereby facilitating the introduction of new installations of subsystems within an existing indoor location system.

BACKGROUND

Over the last two decades outdoor navigation devices have been embraced by the general public. Satellite navigation using the GPS and Glonass satellites became available to consumers initially in the form of dedicated navigation devices, but has really taken off following the introduction of such functionality in smartphones. Apart from providing directions, e.g. in car navigation, such devices are also increasingly being used for providing location aware services.

A similar need for directions and location aware services exists in indoor areas. For example in large indoor complexes, such as hospitals, universities, parking lots, shopping malls, and/or offices.

In an indoor setting satellite based navigation technology generally does not provide sufficient signal strength to be able to perform indoor location determination. For this reason alternative techniques have been developed for position/location determination in indoor settings. Some of these alternative techniques use Radio Frequency (RF) based location determination. Such systems typically make use of multiple radio frequency (RF) transmitters with known locations, also known as anchor nodes or beacons. Other alternative techniques may make use of Visible Light Communication (VLC) transmitters with known locations or beacons which may make use of the usually fairly dense lighting infrastructure.

Similar to an outdoor location system, an indoor location system provides a service to consumers hereafter end-users; a service that end-users will eventually rely on. It is therefore important that the indoor location service is reliable. One aspect of reliability for an end-user is the accuracy of the location that is being reported. Another aspect of reliability is the continuity of the location being reported. A further aspect of reliability is the availability.

Generally an indoor location system will be deployed by a customer that will order such an indoor location system from a supplier. The customer is typically the party that owns/deploys the indoor location system, notably this party may also be the party that offers services based on the indoor location system, but this need not be the case. Consider e.g. a scenario wherein an airport owner also owns and deploys an indoor location system. Airlines and shops that are not necessarily affiliated with the airport owner could offer services based on the indoor location system.

The deployment of an indoor location system will generally incur cost on the customer; as a result the customer will want to make sure that he can recuperate this cost. The cost can be earned back through the services provided based on the indoor location system functionality. In the above example the airport owner will need to recover his investment from the parties that offer services based on the indoor location system. As a result a mechanism is needed that supports such a diverse and complex scenario as the above airport. For paying location based service providers it is important that there are no free-riders; the system therefore also needs to be tamper-resilient.

Notably the above complexity needs to be hidden from the end-user; in a sense that accommodating the above functionality should not come at a loss of ease of use for the end-user.

A further complicating factor in rolling-out a complex system as the system above is that various parties in the system will need to develop and test their part of the system independently from the others. For example, when a large chain of shops rolls out an chain-wide indoor location system, it will be rolled out on a per shop basis; however while some of the stores are still in the process of testing the system, others may already be using the system to provide location based services to end-users.

What is needed thus is a flexible system that can also support the various life-cycles and/or roll-out scenarios that a large scale indoor location system might require.

The systems and methods presented below provide solutions designed to address at least some of these and other challenges.

SUMMARY OF THE INVENTION

Various embodiments are directed herein to methods, systems and services for providing conditional access to indoor location information in a system comprising a mobile device, a positioning webservice and an authorization authority. This section presents an overview of some of these methods and systems in order to provide a basic understanding of various system components, the interaction between such components, and the various steps involved in various embodiments.

In accordance with a first aspect, the invention provides a method of providing conditional access to indoor location information in a system comprising a mobile device, a positioning webservice and an authorization authority, the method comprising: the mobile device performing the steps of: transmitting license information to the authorization authority and transmitting a request for indoor location information to the positioning webservice, the request comprising a request-location-estimate corresponding to a location estimate of the mobile device at the time of making the request, the authorization authority performing the steps of: receiving the license information, verifying whether the license information authorizes access to indoor location information by the mobile device, issuing a secure proof, verifiable by the positioning webservice upon successful verification, the secure proof indicating that the license information authorizes access to indoor location information by the mobile device for an authorized region; the positioning webservice performing the steps of: receiving the request for indoor location information and the secure proof; verifying whether the secure proof authorizes the transmission of indoor location information to the mobile device for the request-location-estimate; and upon successful verification sending indoor location information for the request-location-estimate to the mobile device.

The above method provides the mobile device, which may be an end-user device, with conditional access to indoor location information that the mobile device can use for indoor location functions. By using a secure proof as issued by the authorization authority it is possible to limit access to license and entitlement information on a need to know basis. As a result the positioning webservice will not require the same level of access to the license database as the authorization authority.

Yet based on this construct it is possible to use the secure proof to implement a location based conditional access system for indoor location information by checking that the request-location-estimate is within the authorized region.

The license information as recited above refers to information that provides access to the license; access could be direct or indirect. Direct access relates to the situation wherein the license information comprises the license itself, e.g. when the license information is provided as a digital authorization certificate. Indirect access in turn relates to the situation when the license information functions as a pointer to the license. The latter e.g. includes the use of a unique identifier (UID). The UID allows the retrieval of the license from a license database and thus represents an indirection. It should further be noted that unique here implies unique to the system; rather than unique per se. The generation of unique identifiers of a fixed bit width is well known to those skilled in the art (see e.g. http://en.wikipedia.org/wiki/Universally_unique_identifier). More advanced schemes generally involve random number generators and/or (cryptographic) hash functions.

The above method uses a secure proof that is verifiable by the positioning webservice. Here a secure proof is used to indicate a proof which has been protected against tampering; cryptographic techniques may be used to secure the generation of a secure proof; e.g. the proof could be encrypted using a symmetric cipher wherein both the generating and the verifying party have access to a secret key, thereby providing some protection against tampering. Alternatively the proof could be provided in the form of a digital certificate that makes use of public-key cryptography, such as an X.509 (authorization) certificate. The underlying idea being that authenticity of the secure proof can be verified by the recipient or verifier and that there is a hurdle preventing a third party from spoofing a secure proof.

Advantageously the mobile device transmits a location estimate together with the license information to the authorization authority, the location estimate corresponding to an estimate of the location of the mobile device at the time of sending the license information, the verifying by the authorization authority further comprises verifying that license information authorizes access to indoor location information by the mobile device for the location corresponding to the location estimate. As a result the secure proof also validates that the location estimate of the mobile device when requesting the secure proof was in the authorized region.

The above features add a further location verification step to the process of making indoor location information available. Where the first method presented had the positioning webservice check the location of the mobile device using the secure proof, the above method adds one further location verification step, this time during the generation of the secure proof.

The underlying rationale for adding this step is that a request for a secure proof should be honored only for mobile devices that actually have an interest in obtaining such information; i.e. mobile devices that are authorized for and present at the location.

The request-location-estimate as used for verification by the positioning webservice could be identical to the location estimate used for verification by the authorization authority, for example when a user authenticates to an authorization authority and immediately thereafter downloads the indoor location information from the positioning webservice. However when the end-user moves in the process, so between the transmission of the license information and the location estimate on the one hand, and the transmission of the request for indoor location information on the other hand, then the request-location-estimate may be different from the location estimate.

The above recited method relates to a method as conducted by a mobile device, a positioning webservice and an authorization authority, however the making available of indoor location information is also reflected in a method of providing conditional access to indoor location information in a system comprising a mobile device (15,230), a positioning webservice (310) and an authorization authority (360), the method comprising the mobile device performing the steps of: transmitting license information to the authorization authority, and transmitting a request for indoor location information to the positioning webservice, the request comprising a request-location-estimate corresponding to a location estimate of the mobile device at the time of making the request.

Advantageously the above method further comprises the mobile device transmitting a location estimate together with the license information to the authorization authority, the location estimate corresponding to an estimate of the location of the mobile device at the time of sending the license information, thereby enabling a second location check by the authorization authority.

Advantageously the above methods further comprise the mobile device performing the steps of: receiving the indoor location information from the positioning web service; and storing the indoor location information locally. Although a mobile device could request indoor location information very frequently, it is envisaged that the mobile device comprises an on-board or detachable storage device, such as a (solid state) memory or detachable storage card, that can be used to cache location information for a particular venue. Consider e.g. a situation wherein a user of a mobile device requests indoor location information for a subway station based on her current position on a subway station escalator. In such an event it may be beneficial to download indoor location information for the entire subway station, allowing the mobile device user to navigate through the subway station without further downloading. Alternatively the indoor location information may be partitioned into sections which can be made available separately, the indoor location information may be partitioned in parts corresponding with respective sections of the premises to which they relate; such as floors, or wings of a building. This in turn may be beneficial to reduce storage space requirements and speed up downloads.

Advantageously the above methods further comprise the mobile device performing the steps of triggering an indoor location library to generate a position output at a predetermined output frequency, position output comprising latitude and longitude data representative of the mobile device location. As a result of generating an output at a consistent output rate, the user perception of the performance of the indoor location library can be rendered more consistent over different applications utilizing the indoor location library. The latter is particularly relevant when the party delivering the indoor location library is different from the party providing a software application (App) for use on the mobile device utilizing the indoor location library.

Advantageously the mobile device performs the steps of: receiving a location beacon identifier; obtaining a location beacon position using the location beacon identifier from the location information transmitted upon successful verification; and generating the position output based on the retrieved location beacon position. Methods according to the present invention may be used in conjunction with one or more indoor location technologies based on visible light or radio frequency signals. Such indoor location technologies may make use of established visible light communication (VLC) or RF communication standards such as 802.15.7, 802.11, 802.15.4, Zigbee, Thread or Bluetooth® Low Energy (BLE) also known as Bluetooth® Smart. Notably the claimed invention may make use of multiple location technologies; for example in order to accommodate for an installed base and/or to enable participants to use their technology of preference.

Advantageously, generating the position output further comprises one or more of: using mobile device orientation data from an inertial motion unit of the mobile device, and using multiple location beacon identifiers and generating the position output based thereon. In particular when using an indoor location system wherein the mobile device comprises an inertial motion unit (IMU), the IMU may provide further information pertaining to the position and/or heading of the device which may be useful for indoor location determination. An IMU as found in smartphones typically comprises a compass, an accelerometer and a gyroscope, based on the IMU output it is generally possible to determine a heading. The IMU output may also be used for improving dead-reckoning. In coded light applications the IMU information may even be used in conjunction with camera images of coded lights to deduce position information as described in co-pending application EP14162494.0.

Advantageously, multiple location beacon identifiers can be used for improving location accuracy; e.g. when three or more are received they may be used for trilateration or triangulation purposes. When multiple beacons are received, it may also be possible to correct the orientation as reported by the IMU output for drift.

Advantageously the mobile device further performs the steps of: blocking access to the locally stored indoor location information when a time period exceeds a predetermined threshold, wherein the time period is defined as one of: the period between the current time and the time that the mobile device last had contact with the positioning webservice (a similar period may be defined with regard to the authorization authority in case of the secure proof) and the period between the current time and the last time the mobile device connected to a wide area network providing access to the positioning webservice (a similar period may be defined with regard to the authorization authority in case of the secure proof). Although reliability of mobile device communication has significantly improved over the years, it may be possible that a mobile device may not be able to connect to a network. In situations like this it is advisable to implement measures that accommodate graceful degradation of the level of service.

Consider a situation where during normal operation an end-user that switches on a mobile device, or switches on an indoor location application would always have to obtain a "fresh" secure proof and would always download "fresh" indoor location information. In the absence of network access such a system would not be able to operate even though the data required to perform indoor navigation might be available on the mobile device.

One step in making such a system more lenient would be to relax the requirement for obtaining a "fresh" secure proof every time the indoor location App or library switches on. A more lenient constraint would be to allow the re-use of the secure proof for a location, for a predetermined time-period, for example a day. As the "fresh" secure proof is issued by the authorization authority, waiving this constraint (for a predetermined period) allows graceful degradation when the authorization authority cannot be contacted.

Another step to make the system more fault tolerant/lenient would be to relax the requirement for downloading of "fresh" indoor location information every time the indoor location App or library is started. This would allow an end-user to re-use locally cached location information for a limited predetermined period, e.g. three days, when the positioning webservice in unreachable.

The requirement for downloading of "fresh" indoor location information could be temporarily graced/waived when network access is unavailable, or alternatively when the positioning webservice cannot be contacted.

The blocking of access to the secure proof, or to the indoor location information as recited might be implemented in different manners. For example it may be implemented by the indoor location library being denied access to the secure proof or cached indoor location information. Alternatively it may also be implemented by actively deleting the secure proof and/or indoor location library information from the mobile device on expiry of the respective grace period. More alternatively a similar result may be obtained by simply blocking the output of positioning information over an indoor location library API.

Advantageously the license information as used by the method further directly or indirectly comprises a secure-development-proof, the secure-development-proof authorizing access to indoor location information by the mobile device during development and/or testing. The provisioning of a secure-development-proof allows the system to be tested during the development phase when the positioning webservice and/or the authorization authority are not yet available. The authenticity of the secure-development-proof is preferably verifiable by the indoor location library running on the mobile device. The secure-development-proof could e.g. be configured to allow the decoding of a limited number of predefined beacon identifiers. Alternatively or additionally it could allow a time-limited, or region-limited mode of operation, sufficient to install a system and test functionality of decoding beacon identifiers and/or the application software (App) functionality.

More advantageously the license information further comprises a direct or indirect link to indoor location information for the development phase testing, use of which is authorized by the secure-development-proof. In this manner it may be possible to provide data for a number of beacons, e.g. a number of coded-light light-sources, with known beacon identifiers that have to be positioned in a particular shop at certain reference positions, in order to be able to allow testing and/or operation of the system during the development phase. On account of the limitations and non-extendibility of this information such license information and the secure-development-proof do not represent a serious hazard for system integrity.

The indoor location information preferably comprises latitude and longitude information representative of the position of the beacon in question. For certain technologies; such as a coded light technology further information may be provided such as a mounting height of the coded-light light-sources and optionally a floor indicator. In certain applications; in particular when accuracy is in the 2-5 meter range, the height may not be that relevant; however this also strongly depends on the layout of the premises where the indoor location application is used.

Although the above methods have been described with a focus on the mobile device perspective, the making available of indoor location information is also reflected in a method of providing conditional access to indoor location information in a system comprising a mobile device, a positioning webservice and an authorization authority from a perspective of a positioning webservice, the method comprising the positioning webservice performing the steps of: receiving a request for indoor location information from the mobile device, the request comprising a request-location-estimate corresponding to a location estimate of the mobile device at the time of making the request, receiving a secure proof verifiable by the positioning webservice, wherein the secure verifiable proof is issued by the authorization authority and indicates that the mobile device has provided license information authorizing access to indoor location information by the mobile device for an authorized region, verifying whether the secure proof authorizes the transmission of indoor location information to the mobile device, for the request-location-estimate; and upon successful verification sending indoor location information for the request-location-estimate to the mobile device.

In accordance with the above method the positioning webservice effectively can verify the authorization of the mobile device. As the secure proof and the request-location-estimate for which indoor location information is requested must match the actual indoor location information that is made available; this may be used to prevent a party from requesting indoor location information for an arbitrary place (i.e. where they are not present) or for which they don't have an authorization.

The secure proof preferably validates that the mobile device transmitted a location estimate together with the license information to the authorization authority, the location estimate corresponding to an estimate of the location of the mobile device at the time of sending the license information, and wherein the secure proof validates that the authorized region comprises the location estimate.

In this manner the secure proof shows that the mobile device also was within the authorized region when requesting the secure proof.

The secure proof preferably comprises information identifying a location for which receipt of indoor location information is authorized. Optionally the secure proof further comprises a mobile device identifier. This information allows the offline verification of the authorization of the mobile device to receive information for a particular area. More optionally the secure proof further includes the UID, the latter may further allow logging by the positioning webservice of the request in combination with the UID so as to enable forensic tracking.

The secure proof specifies at least a location for which indoor location information may be received, but generally will specify multiple locations, or an area for which indoor location information may be received. The location specification in the secure proof may allow the specification of information pertaining to a set of beacons, or multiple sets of beacons; e.g. a first set corresponding to the coded-light beacons in public spaces in an office building and a second set corresponding to the places of doing business of a company X in the same office building. The area could be specified in either a machine readable format (e.g. as a location and a radius or as a set of beacon identifiers) or in a human readable format, such as "public lights in building Y" or "offices of company X in building Y". The latter may require associating of the location beacons to the respective regions in order to be able to determine whether the indoor location information associated with the location beacon may be downloaded.

Notably the secure proof may further comprise an authorization level wherein the authorization level may be used by the positioning webservice to further limit or extend the dissemination of indoor location information, depending on the authorization definition. For example the authorization level may indicate that a guest on the premises of offices of company X has authorization to receive information on a subset of beacons only; whereas employees on the premises of offices of company X (and thus having a higher authorization clearance), may receive information on all beacons on the premises of offices of company X. Notably the secure proof might specify an authorization level, wherein the positioning webservice only selectively provides indoor location information to the extent that the authorization level justifies so.

In order to effectuate such the positioning webservice only provides indoor location information to the mobile device when it holds a secure proof indicating it is compliant with the authorization level required for receipt of the indoor location information.

Advantageously the secure proof comprises expiration information and the positioning webservice only provides indoor location information when the secure proof has not expired. In this manner the provisioning of indoor location information can be limited to a time period, e.g. a time period during which the indoor location information is not renewed. As a result it is possible to effectively force the updating of indoor location information subsequent to beacon identifier renewal. The same mechanism however may also be used to temporarily allow guests to download indoor location information during a limited period corresponding to their visit schedule to a building.

Advantageously, the mobile device transmits the license information and the location estimate to the authorization authority, and the secure proof issued by the authorization authority is transmitted from the authorization authority to the mobile device. Because the mobile device has access to the secure proof it may cache the secure proof, so that it need not request a "fresh" secure proof every time it would like to request indoor location information, thereby reducing the number of requests for a secure proof.

Optionally, the mobile device may setup a secure connection with the authorization authority in order to request and receive the secure proof. In this case the positioning webservice may, but need not, acts as a relay, but if so will be oblivious of the information relayed. Once the mobile device has received the secure proof, the mobile device may subsequently setup a(n optionally secure) connection with the positioning webservice for obtaining indoor location information using the secure proof.

More alternatively, the mobile device may setup a(n optionally secure) connection with the positioning webservice and request the issuance of a secure proof and request indoor location information. The positioning webservice in turn may then setup a(n optionally) secure connection with the authorization authority and relay the request for a secure proof to the authorization authority. The authorization authority may then issue the secure proof and send this to the positioning webservice. The positioning webservice may use this secure proof to verify the entitlement of the mobile device for receiving indoor location information and upon a positive verification send the indoor location information to the mobile device. This particular alternative is advantageous in that the secure proof is not made available to the mobile device; however in exchange it may increase the load on the authorization authority.

Advantageously, the indoor location information is a database with one or more entries relating a location beacon identifier to an indoor position, the indoor position comprising a latitude and a longitude. However it is further foreseen that in embodiments the indoor location information also includes the mounting height of the beacon. The latter may e.g. be particularly relevant when using coded light wherein the coded light identifiers are determined using a mobile device camera. More advantageously the indoor location data may also indicate a floor, e.g. when the premises in question is a multi-storey car park. In addition the indoor location information may comprise human readable labels to help displaying location information in navigation applications.

Although in the above the method has been described with a focus on the mobile device perspective and a positioning webservice perspective, the making available of indoor location information also is reflected in a method of providing conditional access to indoor location information in a system comprising a mobile device, a positioning webservice and an authorization authority (360), the method comprising the authorization authority performing the steps of: receiving license information, verifying whether the license information authorizes access to the indoor location information by the mobile device and issuing a secure proof, verifiable by the positioning webservice, upon successful verification, the secure proof indicating that the license information authorizes access to indoor location information by the mobile device for an authorized region; and transmitting the secure verifiable proof to one of the mobile device and the positioning web service.

Using the above approach the authorization authority effectively can provide a secure proof to the mobile device or positioning webservice, indicating in which region the mobile device may receive indoor location information, without the mobile device or the positioning webservice requiring access to the raw authorization database. Effectively the authorization authority provides a secure verifiable proof that allows the other parties to use information on a need to know basis.

The latter in particular applies, when the license information is provided indirectly to the mobile device, i.e. in the form of a UID. In this situation the mobile device merely has an identifier that the authorization authority can relate to the relevant information. The authorization authority further does not need to share access to the authorization information with the positioning webservice, but instead may provide a proof that is tamper resilient. Additionally a location estimate may be provided by the mobile device, the location estimate being indicative of the location of the mobile device at the time of sending the license information. As a result the authorization authority may include a further localization step in that requests by a mobile device for a secure proof are honored only when the location of the mobile device at the time of requesting coincides with an area for which it is actually authorized.

The invention is further embodied in a computer program product downloadable from a communication network and/or stored on a computer-readable and/or microprocessor-executable medium, characterized in that it comprises program code instructions for implementing a method of providing conditional access to indoor location information.

In accordance with a second aspect the invention provides a system for providing conditional access to indoor location information, the system comprising a mobile device, a positioning webservice and an authorization authority and wherein: the mobile device is arranged to transmit license information to the authorization authority, transmit a request for indoor location information to the positioning webservice the request comprising a request-location-estimate corresponding to a location estimate of the mobile device at the time of making the request, the authorization authority server is arranged to: receive the license information, verify whether the license information authorizes access to indoor location information by the mobile device issue a secure proof verifiable by the positioning webservice upon successful verification, the secure proof indicating that the license information authorizes access to indoor location information by the mobile device for an authorized region; the positioning webservice is arranged to: receive the request for indoor location information and the secure proof; verify whether the secure proof authorizes the transmission of indoor location information to the mobile device, for the request-location-estimate; and upon successful verification send indoor location information for the request-location-estimate to the mobile device.

In accordance with a third aspect the invention provides a mobile device for providing conditional access to indoor location information for use in a system further comprising a positioning webservice and an authorization authority, the mobile device being arranged to: transmit license information to the authorization authority, and transmit a request for indoor location information to the positioning webservice, the request comprising a request-location-estimate corresponding to a location estimate of the mobile device at the time of making the request.

In accordance with a fourth aspect the invention provides a positioning webservice for providing conditional access to indoor location information for use in a system further comprising a mobile device and an authorization authority, the positioning webservice implemented on one or more servers, the one or more servers being arranged to individually or in tandem: receive a request for indoor location information from the mobile device, the request comprising a request-location-estimate corresponding to a location estimate of the mobile device at the time of making the request, receive a secure proof verifiable by the positioning webservice, wherein the secure verifiable proof is issued by the authorization authority and indicates that the mobile device has provided license information authorizing access to indoor location information by the mobile device for an authorized region, verify whether the secure proof authorizes the transmission of indoor location information to the mobile device, for the request-location-estimate; and upon successful verification send indoor location information for the request-location-estimate to the mobile device.

In accordance with a fifth aspect the invention provides an authorization authority for providing conditional access to indoor location information for use in a system further comprising a mobile device and a positioning webservice, the authorization authority implemented on one or more servers, the one or more servers being arranged to individually or in tandem: receive license information, verify whether the license information authorizes access to the indoor location information by the mobile device and issue a secure proof, verifiable by the positioning webservice upon successful verification, the secure proof indicating that the license information authorizes access to indoor location information for an authorized region; and transmit the secure verifiably proof to one of the mobile device and the positioning web service.

Notably advantageous embodiments as discussed with reference to the inventive methods equally apply to the mobile device, the positioning webservice and the authorization authority as described hereinabove.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
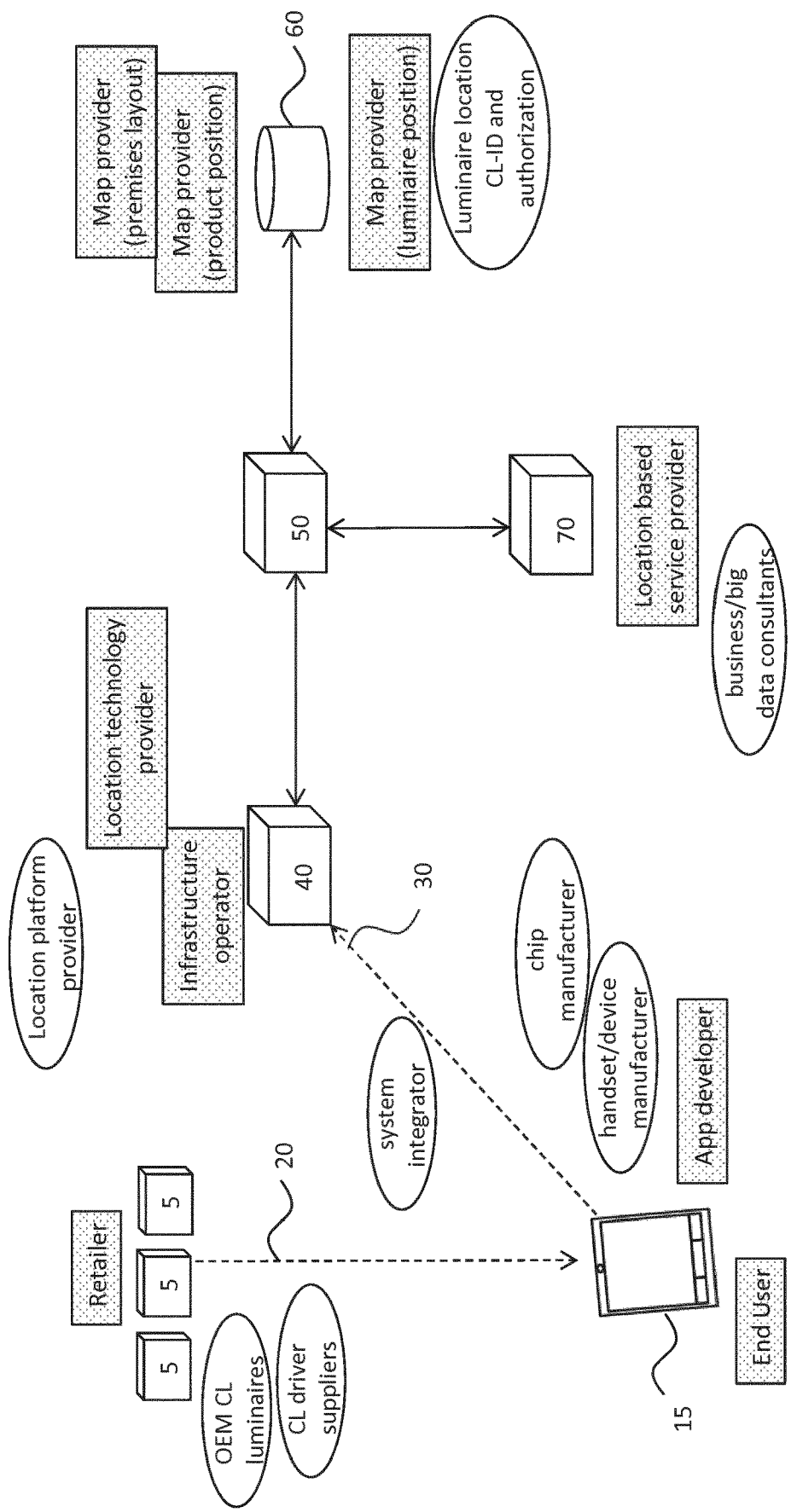
FIG. 1, provides an overview of stakeholders in an indoor location system.

Reference is now made in detail to illustrative embodiments of the invention, examples of which are shown in the accompanying drawings.

In the following detailed description, for purposes of explanation and not limitation, representative embodiments disclosing specific details are set forth in order to provide a better understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known systems, apparatuses and methods may be omitted so as to not obscure the description of the representative embodiments. Such systems, methods and apparatuses are clearly within the scope of the present teachings.

Definitions

Throughout the description reference is made to the term "light source", light source should be understood to refer to any one or more of a variety of radiation sources, including, but not limited to, LED-based sources (including one or more LEDs), incandescent sources (e.g., filament lamps, halogen lamps), fluorescent sources, phosphorescent sources, high-intensity discharge sources.

An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "luminaire" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations.

Although the stakeholders in indoor location systems will be discussed in more detail in the next section, a number of stakeholders are introduced here to simplify the further explanation. The term indoor location system is used throughout this description to refer to the physical indoor location system in the form of system components such as servers, databases and beacons as well as to the logical indoor location system in the form of services. The term "location platform provider" refers to a party offering a platform employing one or more location technologies for use in an indoor location system. The location platform provider provides technology which may be used by a "customer" to offer services to "end-users" directly or indirectly e.g. through a "location based service provider". Notably the "customer" here refers to the party that represents a customer to the "location platform provider" and the "end-user" effectively refers to the party that makes use of the actual indoor location services on offer.

Indoor Location System

The proposed indoor location system, also known as indoor position system, indoor positioning system, or indoor locating system, provides at least a basic function; i.e. providing information on the current position or location of a mobile device or person associated with the mobile device in an indoor environment.

Provided are methods of providing conditional access to indoor location information. Embodiments comprise a mobile device that transmits license information, and transmits a request for indoor location information to a positioning webservice. The positioning webservice verifies whether the mobile device is authorized for the transmission of indoor location information to the mobile device, and, upon successful verification, sends indoor location information to the mobile device.

The above basic function can be perceived as a location or position service. This service in turn can be used to provide further services. Within the context of an indoor navigation system, the position or location could be used to subsequently direct or guide a device user from one location to another; e.g. along a series of locations; i.e. on a route. Within a shopping context, such a route could be created on the fly; e.g. using a web-based shopping service based on an end-user's shopping list.

In the process of navigating along the route, the end-user could be made aware of points of interest, which in a shopping context could represent special offers, etc.

Such indoor location systems may use one or more different location determination technologies to determine the location of the mobile device within the premises.

Throughout this document indoor location systems will be presented that use one or more indoor positioning technologies to determine the position of portable devices within the premises; and subsequently use this information; e.g. by sharing the position with the device user and/or by using the position within the location context.

Stakeholders Within an Indoor Location Eco-System

FIG. 1 provides an overview of an indoor location eco-system that uses coded light beacons for navigation. On the left hand side we see a number of visible light communication (VLC) capable luminaires 5, hereafter referred to as Coded Light (CL) luminaires 5. The coded light luminaires 5 have a dual function; on the one hand the luminaires 5 provide illumination light; i.e. they have an illumination function and on the other hand the luminaires emit coded light 20; i.e. part of the emitted light is modulated and serves a communication function. The coded light thus comprises information, e.g. in the form of location beacons, that can be used to enable indoor positioning. The modulation may be detected using a CL receiver that may use a camera or a light sensitive diode. The modulation itself however is substantially imperceptible to the human visual system.

Although the indoor location system presented in FIG. 1 relates to a shopping application similar functionality could be offered in other environments, such as in subways, train-stations, airports, and/or warehouses that are provided with a powered, commissioned grid that may be leveraged for indoor positioning with limited cost.

The CL luminaires 5 in FIG. 1 are owned by the retailer. The CL luminaires 5 may be CL luminaires supplied by an OEM and may make use of CL drivers supplied by a CL driver supplier.

In FIG. 1 the coded light 20 is received by mobile device 15. Mobile device 15 may be an end-user device fitted with appropriate application software (e.g. a smartphone) or may alternatively be provided by the retailer in the store; i.e. as a separate device (electronic shopping assistant), or integrated in a shopping cart/trolley.

The application software running on the mobile device may be developed by an application software developer, which for mobile phone/tablet related devices is generally referred to as an App-developer. In order to assist the App developer in developing the application software or App, a location technology provider may provide the App developer with an indoor location SDK comprising a location library. In the example the location library is a coded-light location library (not shown) provided by a location technology provider.

Notably when such a location library is standardized, or adopted by an OS vendor, the location library could be provided by the OS vendor or handset manufacturer. Although not explicitly shown in the overview in FIG. 1, the application software for a mobile phone or tablet is generally obtained through an application store of an operating system provider of the mobile device.

Returning to FIG. 1, the mobile device 15 demodulates information that it receives from the CL luminaires 5 in the form of coded light 20 and may subsequently use the demodulated information 30 locally or share this information over a wireless link. In case of a CL based location system the information could for example be a CL beacon identifier. The CL beacon identifier in turn may be used to lookup the latitude and longitude of the CL beacon transmitter. By establishing the location of the CL beacon we have a first approximation of the position of the device. However, using more elaborate techniques it may be possible to provide a much more accurate location, for example using the techniques as described in co-pending application EP14162494.0, hereby incorporated by reference.

As the end-user devices are mobile devices they generally require a wireless link in order to communicate information. This however does not imply that the entire path from end-user device to service provider is wireless. In fact generally only part of the path will be wireless so as to provide access to a wired infrastructure access point 40 (provided by a network operator). The wired infrastructure access point in turn allows communication with servers 50 and 70. The wireless link 30 may be an 802.11 link (also known as WiFi), a Bluetooth link (e.g. BT, or BLE) or a cellular wireless link (GSM/3G/LTE).

On the right hand side of FIG. 1 we see the map information server 50 connected to the map information database 60 and a location based service provider server 70. The map information server 50 not only provides access to the location information associated with beacons, but further provides access to additional location information that can be used by the location based service provider for providing additional services.

FIG. 1 further shows three stakeholders that each provide a different type of map information, more particularly:
  premises map information,
  product/service map information and
  location beacon (CL luminaire) map information.

Although the figure shows three logical map information providers, this does not necessarily imply that such information could not be provided by a single party, however the nature of the information provider is quite distinctive.

A first map information provider provides premises map information; i.e. information pertaining to the shop layout. The shop layout may be substantially uniform for a particular company or franchise. The premises map information will generally include building information; such as, but not limited to, dimensions and positions of floors, aisles, pathways, doors, etc. The premises map information may be based on building plans and is substantially more static than the product/service map information.

A second map information provider provides product/service map information. This map information relates to in-shop product/service positions. Not only will the second map information be more dynamic, it will need maintenance once the building/indoor location system is in use. Advantageously the product/service positions may be defined relative to the premises map information. By defining the placement of the in-shop products relative to the shelves and/or paths as defined by the premises layout, the map information can be defined more efficiently. Moreover this may further allow a more end-user-centric definition, referring to aisles and/or shelves rather than latitude or longitudes. The product/service map information will generally be provided by the retailer.

A third map information provider provides the location beacon map information. The location beacon map information comes available after commissioning the indoor location beacons, here the CL luminaires 5.

In the event the CL luminaires 5 are "not-networked"; i.e. are not connected to a data communication network, each luminaire will generally transmit a single repetitive message or a repetitive sequence of messages. In case of a single message transmission this could e.g. be a CL beacon identifier. In such a scenario the map information will generally include the location of the luminaire within the building as well as the corresponding identifier identifying the luminaire. The map information may optionally comprise an indication of a required authorization level in order to enable the use of different levels of authorization in the indoor location system.

In the event the luminaires are networked devices, the position of the CL luminaires and a unique CL luminaire identifier, such as a MAC address of the respective CL luminaire, might be collected during commissioning and could then later on be used by the in-shop luminaire position provider to configure the luminaires to emit a particular message. It will be clear that the connected case is more flexible because the lighting system can be reconfigured after commissioning. This flexibility may also be used to re-new identifiers of the CL luminaires, thereby frustrating the collection of coded light identifiers by third parties.

Although the above holds for coded light implementations; a similar system may be provided wherein the CL based positioning technology is replaced by an RF based positioning system, such as a BLE based position determination system. In a BLE positioning system, the BLE beacons have a role comparable with those of the CL beacons. Moreover it may also be possible to create hybrid systems, where certain areas in a building support positioning based on CL localization, whereas other areas support positioning based on RF localization, using BLE, or 802.11. The above does not preclude the use of mixed/hybrid systems; comprising coded light and BLE, or other RF positioning systems in the same spatial area, thereby providing additional modalities, for example to support a wider range of end-user devices, or alternatively for improving accuracy.

FIG. 1 further shows a location based service provider server 70, the server 70 may provide cloud services, such as a web-shop application that can be accessed by the end-user over a local area network (LAN) or wide area network (WAN) and that provides further added value. Notably business/big data consultants may also tap into information that comes available from the use of the web-shop applications and use this information to provide feedback to retailers and/or shopping chains.

Indoor Location System Architecture

Figure 5:
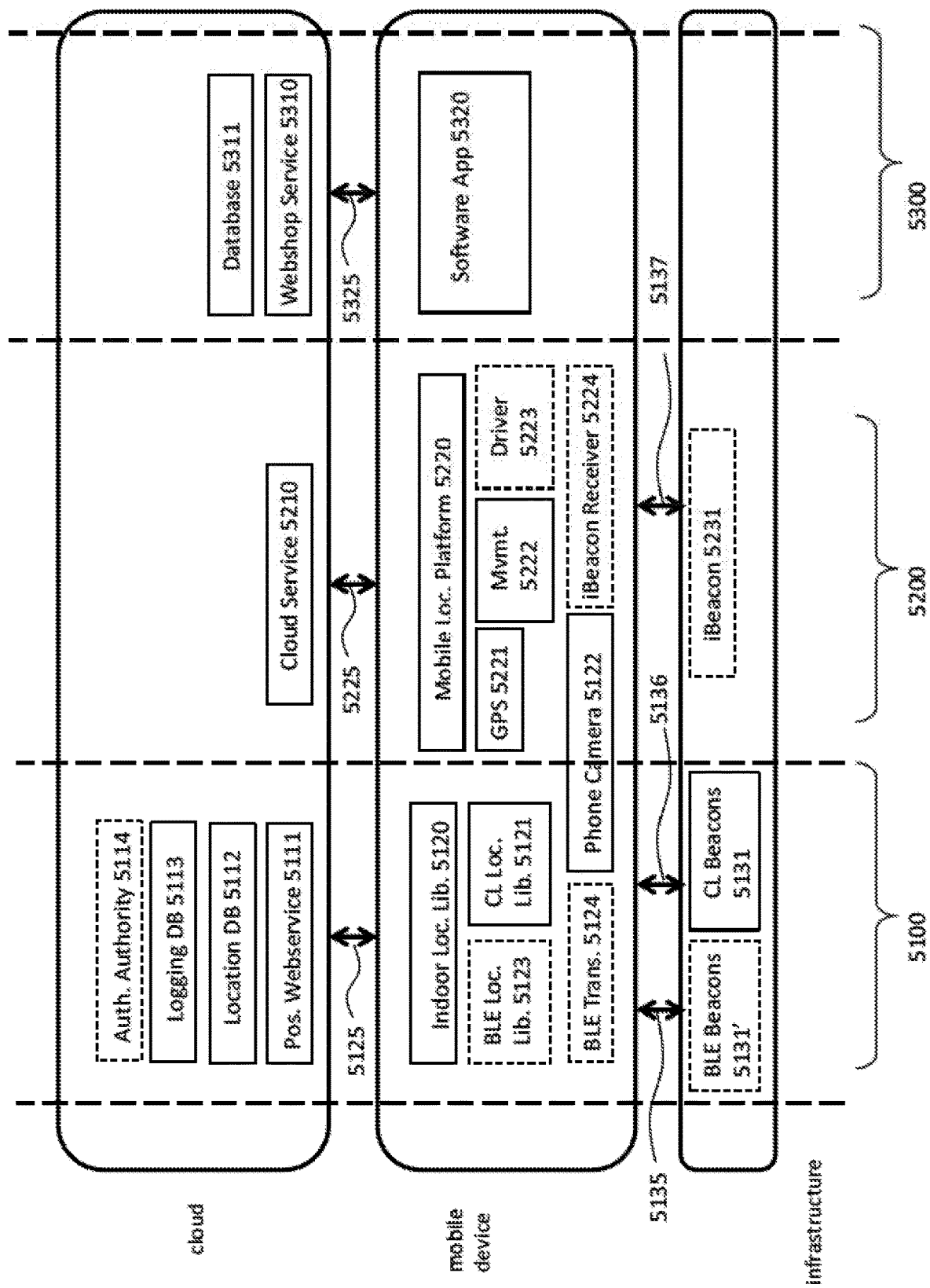

FIG. 5 shows a diagram illustrating the layered architecture of an indoor location system. The overview shows three layers: the lower layer being the infrastructure layer, the middle layer being the mobile device layer and the top layer being the cloud layer. In addition the overview shows three columns; the left column 5100 representing entities associated with the indoor location platform provider, the middle column 5200 representing entities associated with the mobile device platform and the right column 5300 representing entities associated with the location based service provider.

Turning to the left column 5100 on the bottom layer we see that the infrastructure layer comprises CL beacons 5131 and optionally other location beacons such as BLE beacons 5131'. On the middle layer we find the indoor location library 5120. In the example system presented here we have a system that utilizes both CL based location technology as well as BLE location technology. As a result we find a CL location library 5121 and a BLE location library 5123 as separate libraries under the indoor location library. The CL location library 5121 in turn is associated with the mobile phone camera 5122 which acts as a CL receiver. The BLE location library 5123 in turn is linked to the BLE transceiver 5124.

The indoor location library communicates by means of network link 5125 with a positioning webservice 5110 in the cloud layer. The positioning webservice 5111 in turn communicates with a location database 5112, a logging database 5113 and an authorization authority 5114.

Functionally the system works as follows; the CL beacon 5131 may emit a beacon identifier by means of coded light 5136. The coded light 5136 is captured by the mobile phone camera 5122. The beacon identifier comprised in the coded light 5136 can be demodulated by the CL location library and communicated to the indoor location library. The indoor location library in turn may use cached location information to look up the beacon identifier position if available. However, when not available, the indoor location library may contact the positioning webservice 5111 and request the relevant indoor location information from the positioning webservice. The positioning webservice may then, provided that the authorization is in order, retrieve the required indoor location information from the luminaire location database and provide it to the indoor location library.

Turning now to the right column 5300 relating to the location based services. At the mobile device layer we find a software application (App) 5320 that communicates on the one hand with the indoor location library 5120 and on the other hand with a cloud based webshop service 5310 over network link 5325. The indoor location library determines the location of the mobile device as discussed hereinbefore and outputs the location information to the software application 5320. The software application 5320 may use the location information e.g. to visualize the position of the mobile device, but may alternatively provide additional context aware services. For example in the context of a shop example; the software application 5320 may allow the user to select a number of products from a product list and based thereon may contact the cloud based webshop service 5310 over the network link 5325. The webshop service 5310 in turn may check for availability of the products on the shopping list and in the process also retrieve their respective location in the shop from database 5311. The webshop service 5310 may subsequently provide this information to the software application 5320. The software application may then provide feedback to the end-user by visualizing the route to collect all products from the shop using the location information of the mobile device as well as that of the products.

Turning now to the middle column, the middle column corresponds with entities associated with the mobile device platform and/or with alternative location services. At the bottom layer we here find third party iBeacon 5231. The iBeacon 5231 may communicate over a wireless link 5137 with iBeacon receiver 5224. The iBeacon receiver in turn communicates through a driver 5223 with the mobile phone location platform 5220. If so provided the mobile phone location platform 5220 may also communicate with GPS 5221 and/or inertial movement unit 5222. The information collected by the mobile phone location platform in turn may also be shared over network link 5225 with a cloud-service 5210 provided by the mobile phone OS provider.

The stand-alone iBeacons in FIG. 5 illustrate that it is possible to have multiple location technologies available on a mobile phone platform, wherein certain technologies are not supported by the indoor location library 5120.

Interaction with the Cloud and Conditional Access

FIG. 3 shows a block diagram illustrating the interaction of the cloud-based positioning webservice 310 and a smart phone 320 as described hereinbefore. The positioning webservice 310 is a cloud service; i.e. a service that is accessible by means of a LAN or WAN such as the internet. This in practice implies that the functionality of the positioning webservice may be implemented on one or more servers that either individually or in tandem perform the actual functions required. As a result the implementation on the servers need not follow the exact partitioning as presented in FIG. 3.

However, the partitioning as presented herein is particularly advantageous in that it funnels traffic through the positioning webservice 310 and thereby provides a powerful control point for controlling access to the location database 350.

The positioning webservice 310 is at the heart of FIG. 3. The positioning web service 310 communicates with the mobile device 320. More in particular the positioning web service 310 communicates with the indoor location library 323 which in turn communicates with the software application 325. The positioning webservice 310 provides read and write access to a logging database 340 and to the location database 350. The location database 350 preferably comprises information related to the location beacons such as the location and associated identifiers of CL luminaires in a particular building, office or other premises. In the event that the system in addition to CL luminaires also uses BLE beacons, a separate location database may be provided for linking the respective BLE beacons to a particular location. Notably when possible (e.g. when there is no conflict in identifiers) both CL and BLE location database could be combined.

The location database 350 may also comprise information required to communicate with the CL luminaires in the event that the CL luminaires are connected luminaires. The latter is particularly relevant if the connected luminaires communicate using encrypted links, in which case the database may further comprise key information and/or certificates required for contacting and accessing particular connected luminaires.

The positioning webservice 310 also provides access to a logging database 340. The logging database 340 is used to store information pertaining to the usage of the system. This information in turn can be used for data analysis targeted at the indoor location system itself e.g. in order to facilitate maintenance and management of the system. Alternatively the logged information can be used to perform data analysis for particular webservices, provided that such information is forwarded to the positioning webservice.

The positioning webservice provides an interface to the cloud based elements of the indoor location system for end-user devices. To this end the end-user device may e.g. contact the positioning webservice in order to download indoor location information for a particular location based on a CL identifier as detected by the end-user device.

The latter is particularly advantageous when the number of position webservice accesses needs to be kept below a certain threshold. To this end a mobile device may cache indoor location information locally. Preferably indoor location information is shared with the mobile device only when the mobile device is authorized to receive the indoor location information and has an interest to receive it; i.e. when the mobile device is at the location for which the indoor location information is requested.

When indoor location information is requested from the positioning webservice, the positioning webservice can log the request in the logging database. The request for indoor location information may be logged in verbatim, optionally including the time at which the request was received.

When the mobile device has obtained indoor location information and caches part of the indoor location information locally then visibility of system usage may be poor. In such situations it may be beneficial when the smart phone's CL location library or the indoor location library locally logs usage information and periodically reports this to the positioning web service for logging in the logging database.

Such usage information may for example include the coded light identifiers, the position and/or orientation information of the mobile device at the time of receiving the beacon identifier. Notably the logging of information will be subject to local regulations taking into account requirements with regard to end-user privacy.

The positioning webservice 310 further communicates with the authorization authority 360. The authorization authority 360 has access to an authorization database 370, which holds one or more databased entries comprising:

a customer identifier, locations of the customer, (optional) features available to the customer (optionally per location), and (optional) customer status (optionally per location).

The information in the authorization database can be used to regulate access to the indoor location information. For example the customer identifier might identify a chain of grocery stores, wherein some stores have taken a license for using the indoor location system, whereas other stores have not. In order to accommodate, one could make a single database entry for the entire chain, or alternative multiple database entries, one for each store.

In the event a single entry is used for an entire chain; the respective locations need to be specified as well as the features supported. Furthermore in order to account for the differences in customer status, information will be needed for each of the respective stores. The respective locations need to be specified in sufficient detail to be able to distinguish between them. As stores are generally spatially separated it may be sufficient to indicate a position (e.g. latitude and longitude) of the center of the store and a radius. However, if so required the locations may also be described in a different manner.

The information present in the authorization database needs to remain secure. That is preferably a mobile device should not have direct access to the content of the authorization database. In order to prevent tampering with the database it is also preferred that the positioning webservice does not have access to the authorization database in its entirety. In order to address both requirements; one role of the authorization authority 360 in the present indoor location systems is to provide secure proofs, for use in making available the indoor location information to mobile devices.

To this end a mobile device provides license information to the authorization authority as well as (optionally) an estimate of its position that allows the authorization authority to verify the entitlement of the mobile device to receive location information for a particular location. The authorization authority will provide a secure proof provided that the mobile device makes the request from a location and for a location for which the mobile device is authorized to receive indoor location information.

Preferably the license information as provided by the mobile device comprises a unique identifier UID that identifies an entry in the authorization database. In this manner the mobile device does not require access to the license directly; i.e. the UID provides the key for the authorization authority to access the appropriate database record/license. More preferably the UID is tied to a particular SDK package comprising the indoor location library and thus can be distributed together with the indoor location library.

If license information is provided by the mobile device rather than an indirection in the form of a UID, then the license information preferably is in the form of a certificate of which authenticity can be verified by the authorization authority prior to generating the secure proof.

Once the authorization authority has successfully verified that the request by the mobile device originates from a location for which indoor location information can be provided, and the customer authorization is confirmed then a secure proof can be generated which is verifiable by the positioning webservice.

By verifying the location of the mobile device position the generation of the secure proof is made more restrictive; i.e. devices can only obtain a secure proof once they are in an area for which they are licensed. As a result the number of "frivolous" requests for a secure proof can be reduced. However, it also implies that a mobile device can only request a secure proof once it is in the relevant area; this in turn might be construed as being over-restrictive.

If this constraint is relaxed then preferably the authorization authority would be arranged to generate a secure proof based on a request comprising the license information (so without the location estimate). Advantageously the license information would be in the form of a UID. If this more lenient approach is used then preferably the positioning web service will verify using the secure proof that the mobile device is in an area for which is it authorized to receive indoor location information. A secure proof here refers to a cryptographically protected proof of authorization for downloading indoor location information for one or more locations. Preferably the secure proof also indicates which particular features are supported and more preferably also what the required authorization level should be.

Optionally a dedicated payment server can be provided that registers customer payments and initiates updates for the authorization database. Alternatively, the authorization authority may be arranged to also handle customer payments.

The positioning webservice 310 also communicates with a commissioning and logging access unit 330. The commissioning and logging access unit 330 provides access to the infrastructure and logging databases associated with the positioning webservice 310.

The commissioning and logging access unit 330 may be used to enter location data to the location database subsequently/during the commissioning of a new store. The commissioning and logging access unit 330 further provides the maintenance organization access to information collected by the positioning web service for maintenance tasks.
(CL Luminaire) Location Database As indicated above the positioning webservice 310 provides access to the location database 350 and may comprise information such as the location and associated identifiers of CL luminaires in a particular building, office or other premises.

Table 1 below provides an overview of information that may be provided for respective beacons in the location database 350. The information may preferably be used in a CL based indoor location system, but subsets thereof may also be used in conjunction with an RF based indoor location system.

TABLE 1

Exemplary location database entry.

| Field | Description |
|---|---|
| Beacon identifier | Unique identifier as transmitted by the beacon. |
| Coordinate | For example (x,y) on a map. |
| Mounting height (optional) | Mounting height (in meters) relative to the floor level. |
| Floor (optional) | Indicator of floor level |
| Customer ID (optional) | Associates a luminaire to a particular customer (or customers). |
| Authorization level (optional) | Associates a luminaire to a particular minimum authorization level. |
| Shop ID (optional) | Associate a luminaire to a particular shop (or shops). |

Logging Database

As indicated above the logging database 340 is used to store information pertaining to the usage of the system. Preferably the logging database comprises three types of data:

System Operation and Maintenance Data

This includes information for the analysis of system performance, and maintenance.

Usage Data

This includes information that allows usage analysis and tracing of system usage; e.g. the position and/or heading of mobile devices (optionally with time-stamps) and/or an overview of indoor location information requests (requested and/or sent). The information may further include references identifying the software and hardware of the end-user platform, and/or references identifying the versions of the location library software used.

Diagnostic Data

This includes all error codes generated by the software, network device, API interaction, and/or other events.
SDK Software Deployment Model FIG. 4 provides a block diagram illustrating the process of distributing an SDK package comprising an indoor location library for use with a mobile device. Although various indoor location technologies have become available over the last couple of years, the development of the software detecting and/or interfacing with location beacons generally requires specialist skills and thus is generally left to the provider of the indoor location technology. In order to enable App developers to develop software applications for mobile devices, indoor location technology providers may provide an SDK for use by the App developers.

The distribution model as depicted in FIG. 4 allows the distribution of the location SDK on request from a customer or application developer. Using the SDK the customer may, in conjunction with the app developer and/or location based service provider, provide further features on top of the basic indoor positioning service.

The distribution procedure starts with a customer or App developer 440 requesting a location SDK package for download from the positioning SDK download webservice 410.

Preferably the location SDK package comprises the indoor location library and one or more libraries for determining the location, such as e.g. a CL location library. The libraries included in the location SDK package will when executed on the mobile device provide the end-user App with position information.

In addition to the location library/libraries the SDK also comprises license information. The license information can be provided directly or indirectly. In a preferred embodiment the license information provides a pointer to the license information, in the form of a unique identifier (UID) that may be used to access an entry in an authorization database (license) as described hereinabove.

The license information directly or indirectly determines the indoor location functionality that will be made available through the libraries and thereby to the end-user App.

As the functionality offered by the positioning webservice should not be accessible to unauthorized parties, the positioning SDK download webservice interacts with a user management system 460 that verifies using the SDK download authorization database 470 whether the requesting party is authorized to receive the SDK package.

The positioning SDK download webservice 410 retrieves the location SDK from a location SDK database 430 and the license information from a license information generator 450 and combines them in an SDK package that is made available for download to the location SDK requester. The positioning SDK download webservice 410 will log the location SDK package download in a download log database 420; the download log database entry preferably comprises the license information and optionally a customer identifier or device identifier, a date of download, the SDK version.

The download log database 420 provides system management with information for tracking and management purposes, payment purposes (e.g. in the event the download service is not offered free of charge), for notification purposes.

In case a UID is used this should subsequently also be linked to the authorization database 370 in order to allow the authorization authority to access the corresponding license when an App requests a secure proof.

Message Exchange

Figure 6:
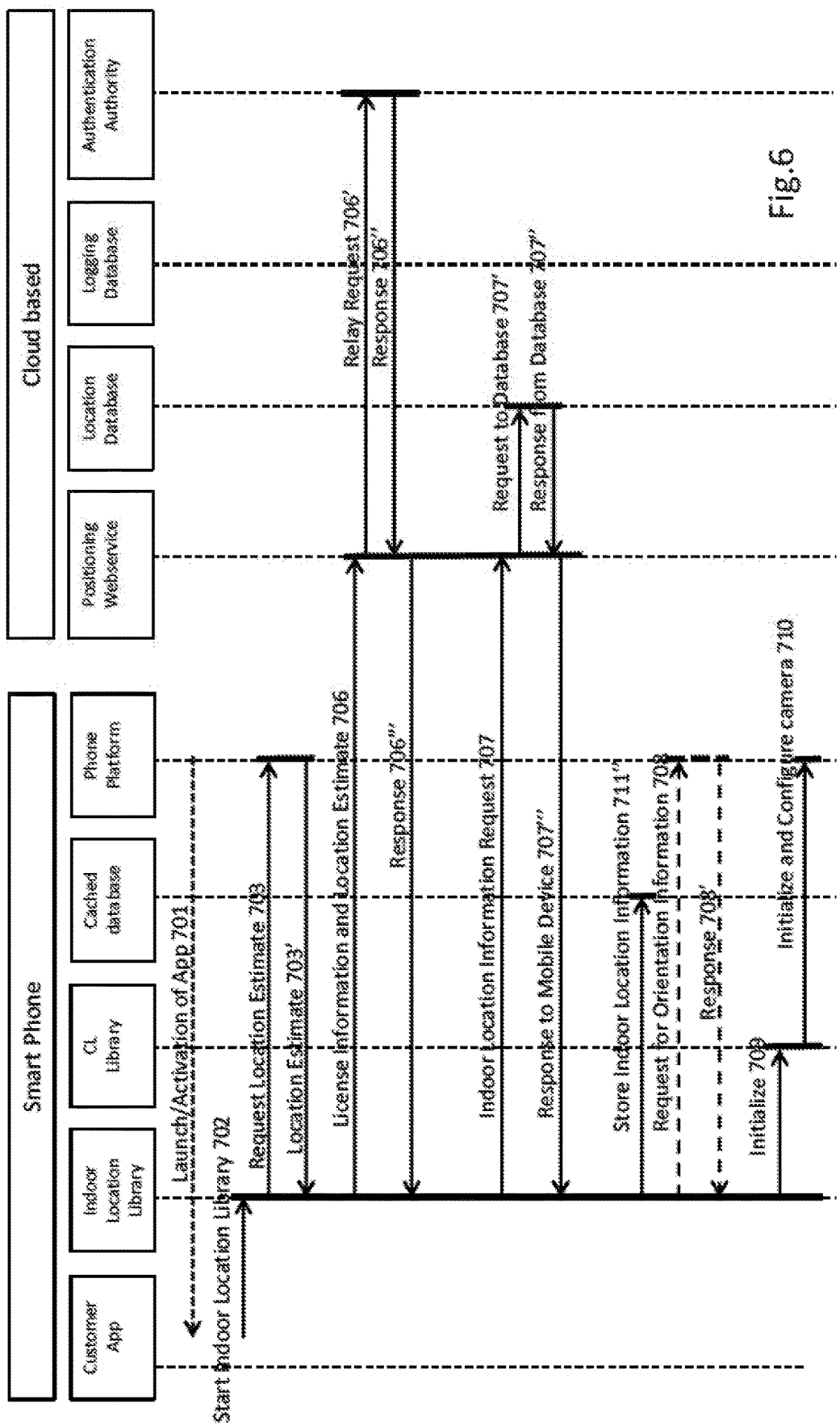
Figure 7:
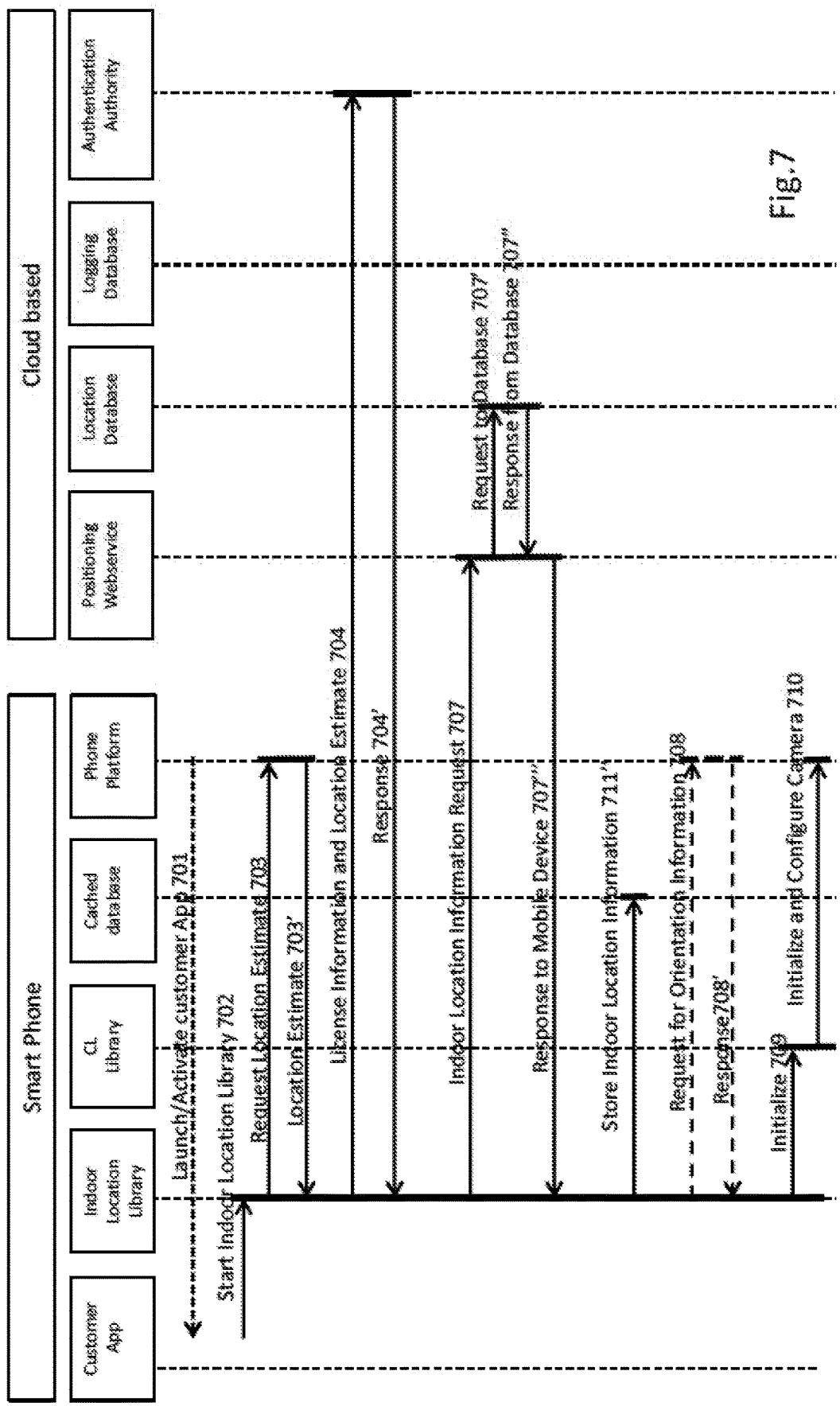
Figure 8:
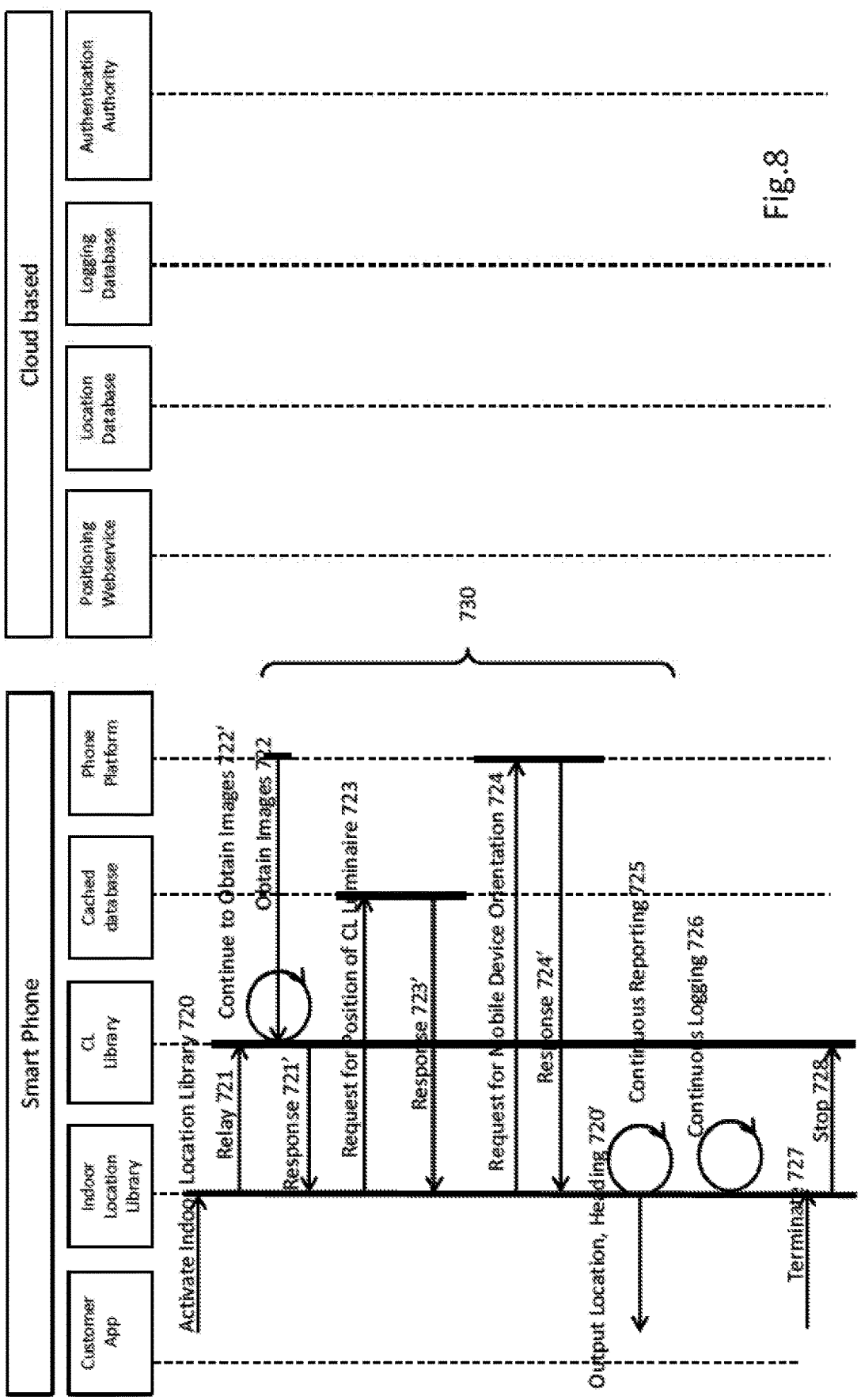

The FIGS. 6-8 show exemplary communication charts illustrating particular message exchanges within an indoor location system.

FIG. 6, provides an exemplary communication chart illustrating the process of initializing the indoor location library on a mobile device, including obtaining a secure proof by the indoor location library.

Consider the situation wherein an end-user has a mobile phone having installed thereon a customer App providing indoor location services. The mobile phone further comprising an indoor location library and a CL library as discussed hereinabove wherein the mobile device has been configured to startup the customer App when it comes in range of a BLE beacon.

When the mobile phone enters a shop with an indoor location system that uses a combination of CL luminaires and BLE beacons, the mobile phone platform may once it detects a BLE beacon trigger the launch/activation of the customer App by means of the message 701. Alternatively the customer App may be launched by the end-user upon entry of the premises, e.g. when the mobile device is incapable of receiving BLE beacons.

The customer App will subsequently start the indoor location library. The indoor location library will subsequently request the phone platform to provide a location estimate by means of message 703. In response the phone platform will communicate the location estimate to the indoor location library by means of message 703'. The message 703' may e.g. be generated based on a GPS position as acquired before entering the premises, by means of trilateration of cell-phone towers, or by other means known to those skilled in the art.

Next the indoor location library will request the authorization authority to provide a secure proof. In order to do so the indoor location library transmits license information and the location estimate to the positioning webservice by means of message 706. The positioning webservice relays the request to the authentication authority by means of message 706'.

The authorization authority subsequently verifies whether or not the license information authorizes access to indoor location information by the mobile device for the location corresponding to the location estimate. If the verification is positive then the authorization authority issues a secure proof, verifiable by the positioning webservice. The secure proof indicates that the license information authorizes access to indoor location information by the mobile device for at least the location corresponding to the location estimate. The authorization authority responds to the request by means of a message 706" which is relayed by the positioning webservice as message 706'''.

Subsequently the indoor location library requests indoor location information from the positioning webservice by sending a request 707 for indoor location information to the positioning webservice. The request comprises the secure proof and a request-location-estimate corresponding to a location estimate of the mobile device at the time of making the request. The positioning webservice on receipt verifies whether the secure proof authorizes the transmission of indoor location information to the mobile device; e.g. by verifying the authenticity of an authorization certificate and further checks based on the authorization specified therein whether the request-location-estimate corresponds with the authorized indoor location information. Upon successful verification the positioning webservice will retrieve the requested indoor location information from the location database and send it to the mobile device using the messages 707' (request to database), 707" (response from database), 707''' (response to mobile device).

In response the indoor location library will store the indoor location information in the cached database for future reference, in order to do so it will send message 711" to the cached database.

Returning to FIG. 6, optionally the indoor location library may issue a request 708 to the phone platform for providing orientation information (e.g. the direction of magnetic North), which is provided by the phone platform using message 708' allowing the indoor location library to align the indoor location information with reality.

Next as a last step the indoor location library triggers the CL library to initialize using message 709, which in turn results in the CL library requesting the mobile phone platform to initialize and configure the (user facing) camera of the mobile phone by means of message 710. At this point the CL library and the Indoor location library are ready for detection.

FIG. 7 provides an alternative communication chart illustrating the process of initializing the indoor location library on a mobile device, including obtaining a secure proof by the indoor location library. The communication chart of FIG. 7 differs from that in FIG. 6 in that the smart phone in FIG. 7 communicates directly with the authorization authority by means of messages 704 and 704' rather than indirectly using the messages 706, 706', 706" and 706'''. Message 704 content wise corresponds with message 706. However message 704 is directed at the authorization authority. Likewise message content 704' corresponds substantially with that of 706''', however message 704' originates from the authorization authority.

FIG. 8 provides an exemplary communication chart illustrating the use of cached indoor location information in a coded light indoor location system.

The customer App initiates the activation of the indoor location library using the message 720. In response the indoor location library will start the CL library. The CL library obtains images from the mobile device camera from the phone platform by means of messages 722. The circular arrow 722' indicates this is a continuous process. The CL library will process the images and will attempt to detect a CL beacon identifier in the images received. Once a CL beacon identifier has been detected, the beacon identifier and the position of the CL luminaire in the images are used to determine the position of the mobile device relative to the CL beacon.

Next the indoor location library retrieves the position of the CL luminaire having the detected CL beacon identifier from the cached database. In the communications chart this is exemplified by the messages 723 and 723' corresponding to the query and response from the cached database. In practice when the cached database is a memory, this may correspond to accessing the appropriate cache entry in memory.

Next or optionally in parallel with the above step the indoor location library requests and receives the mobile device orientation from the phone platform using the messages 724 and 724'. The abovementioned information is used to determine the location of the mobile phone relative to the CL luminaire. Using the latitude, longitude, and mounting height of the CL luminaire as retrieved from the cached database the mobile phone can calculate its position as described in co-pending European patent application EP14162494.0.

Based on the information thus collected the indoor location library calculates the device position and preferably outputs both the location and heading (based on the orientation) at a predetermined output rate; e.g. at 10 Hz symbolized by message 720'. The circular arrow 725 indicates that this reporting is a continuous process. Optionally, the output of location and heading coincides with the logging (message 726) of the location and heading by the indoor location library. Local logging in turn allows the indoor location library to regularly log the location and headings calculated to the logging database when connected to the positioning webservice.

Notably the indoor location library and the CL library generally operate simultaneously, thereby allowing the update of the location output when new CL beacon identifiers are detected by the CL library. At the same time, the indoor location library will use other inputs such as from the mobile phone's inertial motion unit or IMU to update the position. This continuous operation is indicated by the accolade 730.

Operation of the indoor location library in turn may be terminated by the customer App using message 727, after which the indoor location library will stop the CL library.

To Update or Not to Update Indoor Location Information

In order to perform the location calculation the indoor location library uses indoor location information. In particular when such information is cached, freshness of the cached information can become an issue. As indicated hereinabove, various mechanisms are foreseen that may trigger the indoor location library to obtain a "fresh" secure proof and/or "fresh" indoor location information. Here we will briefly discuss some of the possible mechanisms:

Expiry of a Time-Limit

In its simplest for the indoor location library can keep track of a time-limit at which point the indoor location information is considered to have expired. To this end a time-period may be defined beyond which the indoor location information can no longer be used and new data should be retrieved from the positioning webservice.

Such a time-limit could be defined as a predetermined period from the last moment of having network connectivity, or a predetermined period from the last contact of the mobile device with the positioning webservice. Alternatively it may be defined as a fixed period since the indoor location information was downloaded.

Expiry of a Time-Limited Certificate

A slightly more refined solution is to include a time-limited certificate in the downloaded indoor location information. The time-limited certificate may indicate a moment in time, where after the indoor location information can no longer be used and "fresh" indoor location information should be retrieved.

By using a digitally signed certificate it will become more difficult for malicious parties to frustrate the update mechanism.

It is noted that the above mechanisms are merely exemplary and further alternative mechanisms are envisaged.

Indoor Location Library API

The indoor location library as discussed hereinabove may be accessed by the customer App using the indoor location library Application Interface (API). A particularly advantageous API comprises commands that align with the communication charts as discussed herein above. In a preferred implementation the API may comprise commands as listed in Table 2 below.

Plot the Dot

As discussed above with reference to FIG. 8 the indoor location library is arranged to provide a fairly high-frequent location output in the form of a longitude and latitude. The underlying idea being that this will provide a more consistent user experience of the indoor location library across customer Apps. If location accuracy is high (error<0.5 meter), then it may even be possible to allow the customer App to simply "plot the dot".

In order to do so the indoor location library preferably generates a new location every x seconds, wherein x is in the range of 0.01-0.4 seconds or more preferably in the range of 0.05-0.2 seconds.

TABLE 2 indoor location library API

| Input command | Function |
| --- | --- |
| Prepare | Launch indoor location library |
| | Obtain location information from phone platform |
| | Obtain "fresh" secure proof |
| | Obtain "fresh" indoor location information |
| | (Optionally obtain orientation information) |
| | Initialize the CL library and the mobile device camera |
| Start | Trigger the CL library to decode CL beacon identifiers and calculate the mobile device position. |
| | Generate output |
| Stop | Stop the CL library |
| | Stop the indoor location library |
| Standdown | Free the mobile device camera for other applications. |

Which update frequency is preferable may depend on the expected speed of motion of the users and the general robustness and accuracy of the position determination. In the event the position determination is robust and accurate, then motion of the device during the update interval may result in errors in positioning when the refresh interval is too long.

In systems that are less accurate the response time could be set at a lower frequency, although it should be noted that errors as a result from motion will generally be additive to those resulting from errors in the end-user location computation algorithm.

Errors from motion in turn may be partially reduced by using the output from the mobile device's IMU.

Although the indoor location library could be based solely on a CL library, this is not necessary for the invention. Alternatives are foreseen that utilize other modalities such as a BLE or 802.11 location library and/or combinations thereof, as will be discussed with reference to FIG. 2.

Preferably the indoor location library will report the position of the end-user device at a regular interval, preferably at a sufficiently high frequency (e.g. 10 times per second, thus within the 0.05-0.2 second range) and preferably will in addition to the latitude, longitude and direction also comprise a confidence level. The latter may e.g. be used in the end-user application software, to provide the end-user with a reliability indicator.

Optionally the application software could adapt the visualization of the position based thereon. For example when the position of the user is indicated using a dot on a map, then the visualization of the position at a lower accuracy could make use of a larger (possibly more transparent) dot and a higher accuracy position could make use of a smaller non-transparent dot.

In parallel to the output, the indoor location library may conduct local logging of data on the mobile device. This information may e.g. comprise the CL identifiers seen, the timestamp at which these were seen, or alternatively subsampled latitude, longitude and height triplets, optionally with a time-stamp to reduce the amount of data logged.

Combining Outputs from Multiple Modalities

Figure 2:
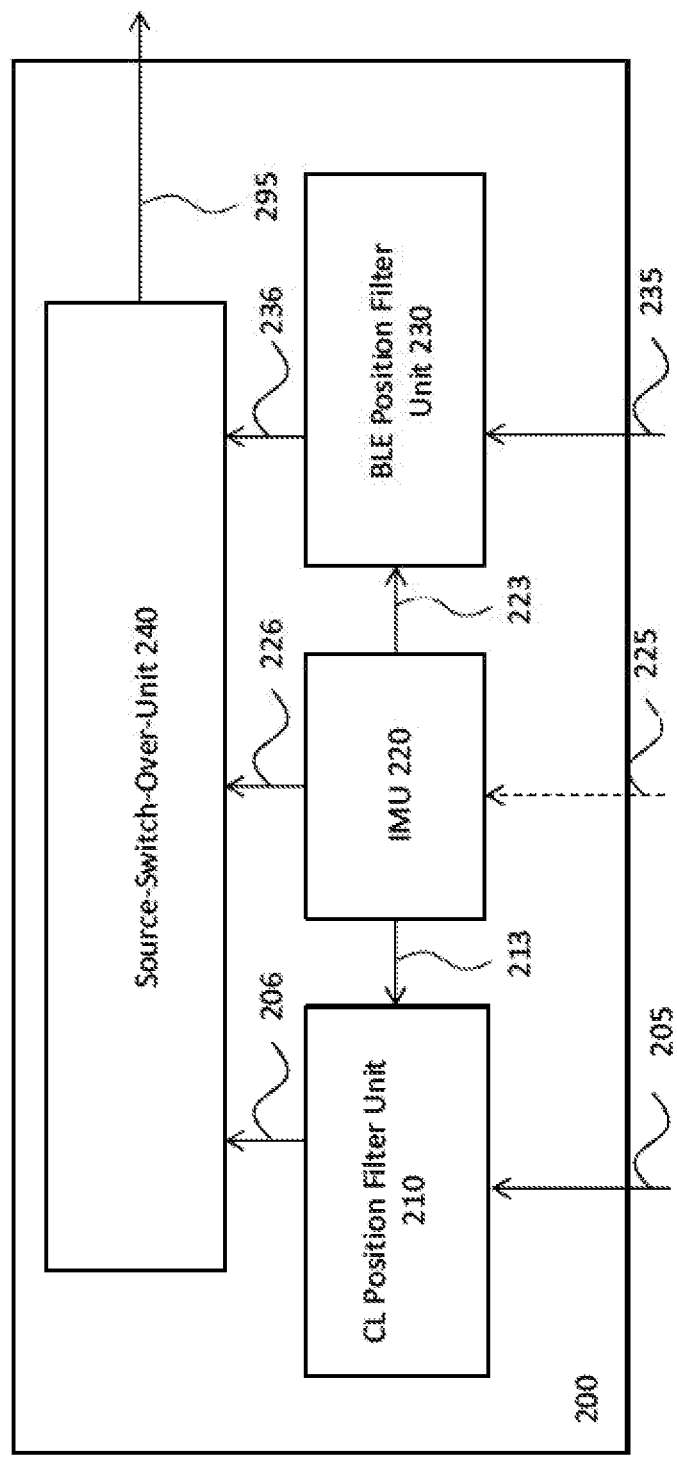
FIG. 2, provides a block diagram illustrating the combination and selection process for the generation of an indoor location estimate, FIG. 3, provides a block diagram illustrating an indoor location system comprising a mobile device, a positioning webservice and an authorization authority, FIG. 4, provides a block diagram illustrating the generation of an SDK package, FIG. 5, provides a layer diagram illustrating the relation between infrastructure, mobile device and cloud layer in an indoor location system, FIG. 6, provides an exemplary communication chart illustrating the process of initializing an indoor location library on a mobile device and obtaining a secure proof, FIG. 7, provides an exemplary communication chart illustrating an alternative process of initializing an indoor location library on a mobile device and obtaining a secure proof, and FIG. 8, provides an exemplary communication chart illustrating the use of cached indoor location information in a coded light indoor location system.

Turning now to FIG. 2, FIG. 2 shows a block diagram illustrating the combination and selection process for the generation of an indoor location estimate. As discussed hereinabove with reference to FIG. 5, an indoor location library may be constructed based on multiple input modalities; for example a CL based modality and a BLE based modality. FIG. 2 shows an example system comprising an indoor location library 200 that utilizes the CL based position output 205 as generated by a CL library (not shown) as well as BLE based position output 235 (not shown) which are enhanced using IMU output 213, 223, and 226 as generated by the IMU from the mobile device. The IMU effectively quantifies external influences indicated by the broken arrow 225 such as the earth's magnetic field, and forces exerted on accelerometer and gyroscopes.

The CL position filter unit 210 receives the CL based location output 205 from the CL library. Preferably the CL based location input comprises location and heading indication as well as reliability metric associated therewith. The CL position filter unit 210 may utilize the reliability metric to filter the position information as provided; i.e. in the event the reliability metric is lower; it is recommended to use a narrower bandwidth low-pass filter so as to prevent fluctuations in the CL position filter unit output 206. The CL position filter may also use information from the IMU in the form of the IMU output 213. IMU output 213 may comprise information such as accelerometer data, this data may be used in order to establish whether or not the mobile device is moving and what the mobile device heading is. In particular this information may be used to perform dead-reckoning.

In a similar manner the BLE position filter unit 230 receives BLE based location output 235 and uses IMU output 223 for filtering the BLE based location output 235. The data from the CL position filter unit 210, the BLE location filter unit 230 and the IMU 220 are subsequently provided as input for the source-switch-over-unit 240, which comprises a decision unit which based on the respective reliability metrics associated with the respective inputs, selects the most reliable location information and outputs the combined location output 295 at a predetermined output rate. Notably one of the tasks of the source-switch-over-unit 240 is to prevent switching back and forth between the possible location inputs in particular when this would adversely affect continuity of the location output 295.

Some of the indoor location systems as presented herein make use of two location verification steps: firstly when generating the secure proof and secondly when providing indoor location information. As suggested hereinabove if a more lenient approach is chosen in which a single location verification step is implemented then preferably this is done by the positioning webservice prior to sending indoor location information to the mobile device.

More alternatively it may be possible to use a single location verification step and still keep the system similarly restrictive as that using two location verification steps. The latter could be realized using an implementation that combines the request for a secure proof and the request for indoor location information. The mobile device could send such a request to the authorization authority directly or indirectly through the positioning webservice. The authorization authority could verify the location of the mobile device before issuing a "fresh" secure proof. The provisioning of the "fresh" secure proof in turn would be an indication for the positioning webservice that the mobile device was at the required location.

Advantageously the authorization authority sends the "fresh" secure proof to the positioning webservice, in order to signal the positioning webservice that the location is verified.

Alternatively when the "fresh" secure proof is sent to the mobile device, then the "freshness" could be indicated using a time-stamp indicative of the time of issuance (and thus verification), or alternatively indicative of a time when the "freshness" expires. This would in turn prove to the positioning webservice that the mobile device was at the required location. Throughout the text reference is made to the term inertial movement unit, however the term IMU is here construed to comprise a wide range of IMU realizations. For example a simply IMU may contain only a compass, however such compass may already provide information pertaining to the user's heading and change in heading. Likewise an IMU containing an accelerometer and a gyroscope may allow tracking of user motion. An IMU comprising only a height sensor may provide information on vertical motion. More advantageously an IMU may comprise multiple of these units that combined can be used to help quantify user motion. Advantageously a more complex IMU comprises one or more of a compass, an accelerometer, an altimeter, and/or a gyroscope and may thus provide more comprehensive measurements.

Below an advantageous method of distributing a software development kit (SDK) package is provided. The software development kit (SDK) package comprises an SDK comprising an indoor location library for a mobile device. The method comprises: receiving an SDK request from a first party, the request comprising identification information allowing the verification of the first party identity; verifying the identification information and checking an SDK authorization database to establish if the first party is authorized to download the SDK, upon positive verification enabling download of the SDK package by the first party, the package comprising: the SDK and SDK license information, the SDK license information comprising a unique identifier (UID), the unique identifier linked to an authorization database entry in an authorization database.

The positioning SDK webservice receives the SDK request and establishes whether or not the first party is entitled to receive an SDK package, when positive the SDK webservice prepares an SDK package for the first party to download. The SDK license information comprised in the SDK package provides access to the SDK license directly or indirectly. When the SDK license information provides direct access to the SDK license, the SDK license information comprises the SDK license itself.

When the SDK license information provides indirect access to the license, the SDK license information provides a pointer that provides access to the SDK license. Advantageously the pointer is a unique identifier UID. The UID in turn provides access to an authorization database entry comprising the license identifying the customer, the location(s) of the customer for which authorized, the feature(s) of the system for which the customer is authorized, and the customer status of the customer. The latter is relevant for determining whether or not to issue a secure proof; i.e. when a contract has lapsed no secure proof will be issued.

The advantage of using the UID is that again information is shared only on a need to know basis. The UID mentioned above in relation to the SDK distribution corresponds with the UIDs as discussed hereinabove with reference to the methods of providing conditional access to indoor location information. By providing this information in the SDK package, an application software developer for a mobile device may download the SDK package and develop application software (App) for use with the mobile device.

The software application as developed by an application software developer (App developer) on the mobile device also has access to the UID. The UID can be used by the indoor location library when contacting the authorization authority for obtaining a secure proof; a secure proof which in turn preferably includes the mobile device identifier as well as an indication for the locations for which the mobile device may receive indoor location information.

Optionally the license information authorization database entry further comprises a customer ID, which may also be included in the secure proof; thereby enabling a more elaborate logging of access to the indoor location information.

Optionally the SDK package further includes a secure-development-proof, the secure-development-proof authorizing access to select indoor location information by the indoor location library on the mobile device (15,320) for development phase testing. The secure-development-proof may allow a spatially limited and/or temporally limited use of indoor location information for example in a development or test phase.

Optionally the SDK package further comprises indoor location information for the development location for the development phase testing, use of which is authorized by the secure-development-proof. In this manner the SDK package may facilitate the testing of a new installation of a subsystem in an existing indoor location system.

Further provided is a computer program product downloadable from a communication network and/or stored on a computer-readable and/or microprocessor-executable medium, characterized in that it comprises program code instructions for implementing a method of distributing an SDK for deploying an indoor location library for a mobile device.

Further provided is a positioning SDK webservice for distributing an SDK package comprising an SDK comprising an indoor location library for a mobile device, the positioning SDK webservice implemented on one or more servers, the one or more servers being arranged to individually or in tandem: receive an SDK request from a first party, the request comprising identification information allowing the verification of the first party identity; verify the identification information and check an SDK authorization database to establish if the first party is authorized to download the SDK, upon positive verification enable download of the SDK package by the first party, the SDK package comprising: the SDK and SDK license information, the SDK license information comprising a unique identifier (UID), the unique identifier linked to an authorization database entry in an authorization database.

Advantageous embodiments of the method of distributing a software development kit (SDK) package are set out in the following clauses. The Applicants hereby give notice that new claims may be formulated to such clauses and/or combinations of such clauses and/or features taken from the description, during prosecution of the present application or of any further application derived therefrom.

1. Method of distributing an SDK package comprising an SDK comprising an indoor location library for a mobile device (15,320), the method comprising:
   receiving an SDK request from a first party, the request comprising identification information allowing the verification of the first party identity;
   verifying the first party identity using the identification information and checking an SDK authorization database (470) to establish if the first party is authorized to download the location SDK package,
   upon positive verification enabling download of the SDK package by the first party, the SDK package comprising:
      the SDK and
      SDK license information,
   the SDK license information comprising
      a unique identifier, the unique identifier linked to an authorization database entry in an authorization database (370).

2. Method of clause 1, wherein the SDK package further comprises a secure-development-proof, the secure-development-proof authorizing access to select indoor location information by the indoor location library on the mobile device (15,320) for development phase testing.

3. Method of clause 2, wherein the SDK package further comprises indoor location information for the development phase testing, use of which is authorized by the secure-development-proof.

4. Method of clause 1-3, wherein the secure-development-proof comprises an authorized phase indicator, enabling a compliance check of the authorized phase indication with a current phase indication by the indoor location library.

5. Computer program product downloadable from a communication network and/or stored on a computer-readable and/or microprocessor-executable medium, characterized in that it comprises program code instructions for implementing a method according to any one of clauses 1-4 when executed on a computer.

6. A positioning SDK webservice for distributing an SDK package comprising an SDK comprising an indoor location library for a mobile device (15,320), the positioning SDK webservice implemented on one or more servers, the one or more servers being arranged to individually or in tandem:
- receive an SDK request from a first party, the request comprising identification information allowing the verification of the first party identity;
- verify the identification information and check an SDK authorization database (470) to establish if the first party is authorized to download the SDK,
- upon positive verification enable download of the SDK package by the first party, the SDK package comprising:
  - the SDK and
  - SDK license information, the SDK license information comprising
- a unique identifier, the unique identifier linked to an authorization database entry in an authorization database (370).

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. Method of providing conditional access to indoor location information in a system comprising a mobile device, a positioning webservice and an authorization authority, the method comprising the positioning webservice performing the steps of:
- receiving a request for indoor location information from the mobile device, the request comprising a request-location-estimate corresponding to a location estimate of the mobile device at the time of making the request,
- receiving a secure proof verifiable by the positioning webservice, wherein the secure verifiable proof is issued by the authorization authority and indicates that the mobile device has provided license information authorizing access to indoor location information by the mobile device for an authorized region,
- verifying whether the secure proof authorizes the transmission of indoor location information to the mobile device, by verifying, using the secure proof, that the request-location-estimate is within the authorized region; and
- upon successful verification sending indoor location information for the request-location-estimate to the mobile device.

2. A positioning webservice for providing conditional access to indoor location information for use in a system further comprising a mobile device and an authorization authority, the positioning webservice implemented on one or more servers, the one or more servers being arranged to individually or in tandem:
- receive a request for indoor location information from the mobile device, the request comprising a request-location-estimate corresponding to a location estimate of the mobile device at the time of making the request,
- receive a secure proof verifiable by the positioning webservice wherein the secure verifiable proof is issued by the authorization authority and indicates that the mobile device has provided license information authorizing access to indoor location information by the mobile device for an authorized region,
- verify whether the secure proof authorizes the transmission of indoor location information to the mobile device, by verifying, using the secure proof, that the request-location-estimate is within the authorized region; and
- upon successful verification send indoor location information for the request-location-estimate to the mobile device.

3. Method of providing conditional access to indoor location information in a system comprising a mobile device a positioning webservice and an authorization authority, the method comprising:
- the mobile device performing the steps of:
  - transmitting license information to the authorization authority and
  - transmitting a request for indoor location information to the positioning webservice, the request comprising a request-location-estimate corresponding to a location estimate of the mobile device at the time of making the request,
- the authorization authority performing the steps of:
  - receiving the license information,
  - verifying whether the license information authorizes access to indoor location information by the mobile device,
  - issuing a secure proof, verifiable by the positioning webservice upon successful verification, the secure proof indicating that the license information authorizes access to indoor location information by the mobile device for an authorized region;
- the positioning webservice performing the steps of:
  - receiving the request for indoor location information and the secure proof;
  - verifying whether the secure proof authorizes the transmission of indoor location information to the mobile device by verifying, using the secure proof, that the request-location-estimate is within the authorized region; and upon successful verification sending indoor location information for the request-location-estimate to the mobile device.

4. Method of claim 3, wherein
the mobile device transmits a location estimate together with the license information to the authorization authority, the location estimate corresponding to an estimate of the location of the mobile device at the time of sending the license information,
the verifying by the authorization authority further comprises verifying that license information authorizes access to indoor location information by the mobile device for the location corresponding to the location estimate, and
wherein the secure proof validates that the authorized region comprises the location estimate.

5. Method of claim 4, further comprising the mobile device performing the steps of:
triggering an indoor location library to generate a position output at a predetermined output frequency, the position output comprising latitude and longitude data representative of the mobile device location.

6. Method of claim 5, further comprising the mobile device performing the steps of:
receiving a location beacon identifier;
obtaining a location beacon position using the location beacon identifier from the location information transmitted upon successful verification; and
generating the position output based on the retrieved location beacon position.

7. Method of claim 6, wherein generating the position output further comprises one or more of:
using mobile device orientation data from an inertial motion unit of the mobile device, and
using multiple location beacon identifiers and generating the position output based thereon.

8. Method of claim 5, further comprising the mobile device performing the steps of:
receiving the indoor location information from the positioning web service; and
storing the indoor location information locally,
blocking access to the locally stored indoor location information when a time period exceeds a predetermined threshold, wherein the time period is defined as one of:
the period between the current time and the time that the mobile device (15,320) last had contact with the positioning webservice and
the period between the current time and the last time the mobile device (15,320) connected to a wide area network providing access to the positioning webservice.

9. Method of claim 3, wherein the license information further comprises a secure-development-proof, the secure-development-proof authorizing access to select indoor location information by the mobile device or development phase testing.

10. Method of claim 4, wherein the secure proof comprises information identifying a location for which receipt of indoor location information is authorized and optionally a mobile device identifier.

11. Method of claim 4, wherein the secure proof comprises an authorization level and the positioning webservice only provides indoor location information to the mobile device when it holds a secure proof indicating it is compliant with the authorization level required for receipt of the indoor location information.

12. Method of claim 4, wherein the secure proof comprises expiration information and the positioning webservice only provides indoor location information when the secure proof has not expired.

13. Method of claim 4, wherein the indoor location information is a database with one or more entries relating a location beacon identifier to an indoor position, the indoor position comprising a latitude and a longitude.

14. A non-transitory computer-readable storage device with computer-executable instructions stored thereon that, when executed by one or more computer processors for a positioning webservice, cause the one or more computer processors to perform operations of providing conditional access to indoor location information in a system comprising a mobile device, the positioning webservice, and an authorization authority, the operations comprising:
receiving a request for indoor location information from the mobile device, the request comprising a request-location-estimate corresponding to a location estimate of the mobile device at the time of making the request;
receiving a secure proof verifiable by the positioning webservice, wherein the secure verifiable proof is issued by the authorization authority and indicates that the mobile device has provided license information authorizing access to indoor location information by the mobile device for an authorized region;
verifying whether the secure proof authorizes the transmission of indoor location information to the mobile device, by verifying, using the secure proof, that the request-location-estimate is within the authorized region; and
upon successful verification sending indoor location information for the request-location-estimate to the mobile device.

15. System for providing conditional access to indoor location information, the system comprising a mobile device, a positioning webservice and an authorization authority and wherein:
the mobile device arranged to
transmit license information to the authorization authority,
transmit a request for indoor location information to the positioning webservice the request comprising a request-location-estimate corresponding to a location estimate of the mobile device at the time of making the request,
the authorization authority server is arranged to:
receive the license information,
verify whether the license information authorizes access to indoor location information by the mobile device
issue a secure proof verifiable by the positioning webservice upon successful verification, the secure proof indicating that the license information authorizes access to indoor location information by the mobile device for an authorized region;
the positioning webservice is arranged to:
receive the request for indoor location information and the secure proof;
verify whether the secure proof authorizes the transmission of indoor location information to the mobile device, by verifying, using the secure proof, that the request-location-estimate is within the authorized region; and upon successful verification send indoor location information for the request-location-estimate to the mobile device.

\* \* \* \* \*